(12) United States Patent
Blatt et al.

(10) Patent No.: US 11,989,113 B2
(45) Date of Patent: May 21, 2024

(54) EFFICIENTLY DEBUGGING A PROGRAM IN HOMOMORPHICALLY ENCRYPTED SPACE

(71) Applicant: Duality Technologies, Inc., Maplewood, NJ (US)

(72) Inventors: Marcelo Blatt, Modiin (IL); Liron Liptz, Even Yehuda (IL)

(73) Assignee: Duality Technologies, Inc., Maplewood, NJ (US)

(*) Notice: Subject to any disclaimer, the term of this patent is extended or adjusted under 35 U.S.C. 154(b) by 137 days.

(21) Appl. No.: 17/504,882

(22) Filed: Oct. 19, 2021

(65) Prior Publication Data

US 2022/0121552 A1 Apr. 21, 2022

Related U.S. Application Data

(60) Provisional application No. 63/093,552, filed on Oct. 19, 2020.

(51) Int. Cl.
*G06F 11/36* (2006.01)
*H04L 9/00* (2022.01)

(52) U.S. Cl.
CPC ........ *G06F 11/362* (2013.01); *G06F 11/3664* (2013.01); *G06F 11/3684* (2013.01);
(Continued)

(58) Field of Classification Search
CPC .............. G06F 11/362; G06F 11/3664; G06F 11/3684; G06F 11/3688; G06F 11/3692; H04L 9/008
See application file for complete search history.

(56) References Cited

U.S. PATENT DOCUMENTS 7,392,378 B1 6/2008 Elliot
7,441,267 B1 10/2008 Elliot
(Continued)

OTHER PUBLICATIONS

Kölsch et al ; Simulation-Based Performance Validation of Homomorphic Encryption Algorithms in the Internet of Things; 24 pages (Year: 2019).*

(Continued)

*Primary Examiner* — Wei Y Zhen
*Assistant Examiner* — Brahim Bourzik
(74) *Attorney, Agent, or Firm* — PEARL COHEN ZEDEK LATZER BARATZ LLP

(57) ABSTRACT

A device, system and method for debugging a homomorphically encrypted (HE) program. The HE program comprising real ciphertext data and encrypted operations in the HE space (production mode) may be mapped to an equivalent plaintext program comprising equivalent pseudo-ciphertext data and pseudo-encrypted operations in the unencrypted space (simulation mode). The plaintext program may be executed in a first full pass in simulation model and a sampling of the HE program may be executed in a second partial pass in production mode, the results of which are compared. The HE program and/or mapping may be validated if the results of simulation and production mode match and debugged if the results do not match. An integrated development environment (IDE) may switch among the HE space (production mode), the unencrypted space (simulation mode), and a combination of both HE and unencrypted spaces simultaneously (simultaneous production-simulation mode).

16 Claims, 3 Drawing Sheets

(52) U.S. Cl.
CPC ...... *G06F 11/3688* (2013.01); *G06F 11/3692* (2013.01); *H04L 9/008* (2013.01)

(56) References Cited

U.S. PATENT DOCUMENTS

| | | | |
|---|---|---|---|
| 2013/0329883 A1* | 12/2013 | Tamayo-Rios | H04L 9/008 380/28 |
| 2016/0342499 A1* | 11/2016 | Cheng | G06F 11/3644 |
| 2017/0134156 A1* | 5/2017 | Laine | H04L 9/008 |
| 2017/0250819 A1* | 8/2017 | Hoffstein | H04L 9/3026 |
| 2018/0097634 A1 | 4/2018 | Uppal et al. | |
| 2018/0198613 A1* | 7/2018 | Anderson | G06F 21/602 |
| 2020/0151356 A1* | 5/2020 | Rohloff | G06F 21/6245 |
| 2020/0186325 A1* | 6/2020 | Anderson | G06F 21/606 |
| 2020/0409812 A1* | 12/2020 | Wu | G06Q 20/10 |
| 2023/0008949 A1* | 1/2023 | Ahn | H04L 9/008 |

OTHER PUBLICATIONS

Boura et al; Simulating Homomorphic Evaluation of Deep Learning Predictions; 19 pages (Year: 2019).*

* cited by examiner

EFFICIENTLY DEBUGGING A PROGRAM IN HOMOMORPHICALLY ENCRYPTED SPACE

CROSS-REFERENCE TO RELATED APPLICATIONS

This application claims the benefit of U.S. Provisional Application Ser. No. 63/093,552, filed Oct. 19, 2020, which is hereby incorporated by reference in its entirety.

BACKGROUND OF THE INVENTION

Recent advancements in the area of privacy-enhancing technologies (PETS) allows to preserve the privacy of data throughout its life cycle and enables data to be used securely and privately.

When it comes to privacy-preserving machine learning, these powerful technologies, such as homomorphic encryption—allow organizations to encrypt in either the machine model, the data, or both and evaluate it in its encrypted state. This removes the privacy and security vulnerabilities as the result can be decrypted only by the entity designated to do so.

Specifically, Homomorphic Encryption (HE) is a type of encryption that allows computing devices to perform computations on encrypted data without decrypting it first. The result of the computation is in an encrypted form, such that, when decrypted the output is the same as if the operations had been performed on the unencrypted data, but no secret data is revealed.

This creates a new paradigm for secure and private machine learning and decisioning across organizations and jurisdictions, enabling the decentralization of data sharing as data owners can collaborate while retaining positive and auditable control of their data assets. When considering whether to use privacy-preserving machine learning, the benefits should be evaluated including the sensitivity of the data involved and the potential value gained by broadening the scope of the model's use.

PET can be used for privacy-preserving outsourced storage and computation. This allows data to be encrypted and out-sourced to commercial cloud environments for processing, all while encrypted. In highly regulated industries, such as health care, it can be used to enable new services by removing privacy barriers inhibiting data sharing. For example, predictive analytics in health care can be hard to apply due to medical data privacy concerns, but if the predictive analytics service provider can operate on encrypted data instead, these privacy concerns are diminished.

However, this new paradigm implies a significant challenge for machine learning practitioners, data scientists and programmers in general: debugging. As intermediate results are encrypted, finding and resolving the code flaws or "bugs" is not possible using standard integrated development environment (IDE).

Debugging in HE space is often extremely slow and inefficient. Data is encrypted, computations are then run in HE space to output an encrypted result, and the result is decrypted to analyze its accuracy. A debugging process which would have taken, e.g., milliseconds in plaintext space could take minutes to hours in HE space. When debugging, hour long breaks are impractical.

Accordingly there is a need in the art for efficiently debugging in HE space.

SUMMARY OF THE INVENTION

Embodiments of the invention solve the aforementioned problem in the art by providing an efficient technique to debug a HE program. Embodiments of the invention provide a translation between the HE program comprising ciphertexts and encrypted computations and an equivalent unencrypted (plaintext) program (or subprograms) that mimic or simulate the encrypted program comprising pseudo-ciphertexts and pseudo-encrypted computations all in the unencrypted (plaintext) space. The unencrypted program may simulate complex and time-consuming encrypted computations while staying in efficient unencrypted (plaintext) space. The plaintext program may expose intermediate primitive and/or evaluation computations of the HE program, e.g., EvalAdd, EvaluMult, etc. This allows the plaintext program to simulate the cryptographic primitives by meeting the input and output signatures, while using plaintext instead of ciphertext (a "pseudo," "dummy," or "simulated" ciphertext). This allows switching between debugging in HE space ("production" mode) which is relatively inefficient, and debugging in plaintext space ("simulation" mode) which is relatively efficient. Embodiments of the invention provide a hybrid encrypted-unencrypted debugging environment, in which debugging is primarily performed in plaintext space (simulation mode) and validated against a minority sampling of that debugging in HE space (production mode) to ensure accuracy of the efficient simulation mode debugging. Embodiments may run an entire program or sub-program plaintext code in simulation mode (e.g., simulate pseudo-encrypted computation in plaintext space) and a sample of the entire program or sub-program of equivalent translated encrypted code in production mode (e.g., execute actual encrypted computations and decrypt the result). If the equivalent portion of the simulation mode output matches the production mode output, the code is validated. Otherwise, the program is debugged. Debugging by executing code primarily in the efficient plaintext space (simulation mode), and only subset samplings of that code in the inefficient HE space (production mode), increases the speed and reduces the complexity of the debugging computations by executing a greater proportion of the code in unencrypted (plaintext) space than in HE space. The speed up for testing code in unencrypted plaintext space (simulation mode) is at least an order of magnitude faster, sometimes more depending on the configuration, compared to convention HE debugging. Thus, the total increase in code execution speed is based on this proportion of execution in unencrypted vs. HE space. For example, if 10% of the code tested in simulation mode is sampled and validated in production mode, code testing may be executed approximately nine times faster than a conventional fully HE debugging technique (ten times faster for simulation mode minus 10% at full production mode speed).

In an embodiment of the invention, a device, system and method is provided for debugging a homomorphically encrypted program. The homomorphically encrypted program comprising real ciphertext data and encrypted operations in the homomorphically encrypted space may be mapped to an equivalent plaintext program comprising plaintext pseudo-ciphertext data and pseudo-encrypted operations in plaintext space that simulate at least some of the real homomorphically encrypted ciphertext data and operations. In a first full pass, the plaintext program comprising the plaintext pseudo-ciphertext data and pseudo-encrypted operations may be executed in plaintext space. In a second partial pass, a sampling of the homomorphically encrypted program comprising a subset of the real ciphertext data and operations may be executed in homomorphically encrypted space that are equivalent to the plaintext pseudo-ciphertext data and pseudo-encrypted operations. The results of the subset of the real ciphertext data and operations in the first pass of the HE program may be compared with the equivalent plaintext pseudo-ciphertext data and pseudo-encrypted operations in the second pass of the plaintext program. If the compared results match, the homomorphically encrypted program may be validated. If the compared results do not match, the mapping between the homomorphically encrypted program and the plaintext program may be debugged.

In an embodiment of the invention, a device, system and method is provided for debugging a homomorphically encrypted program. An integrated development environment (IDE) may be switched among three modes of operation: a production mode comprising displaying real ciphertext data and encrypted operations of the homomorphically encrypted program in the homomorphically encrypted space, a simulation mode comprising displaying plaintext pseudo-ciphertext data and pseudo-encrypted operations of a plaintext program in plaintext space that simulate at least some equivalent real homomorphically encrypted ciphertext data and pseudo-encrypted operations, and a hybrid simulation-production mode comprising simultaneously displaying both the real ciphertext data and encrypted operations of the homomorphically encrypted program and the equivalent plaintext pseudo-ciphertext data and pseudo-encrypted operations of the plaintext program. The IDE may toggle among the three modes to compare the HE program and unencrypted program for validating the HE program when the comparison matches and debugging the HE program when the comparison does not match.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
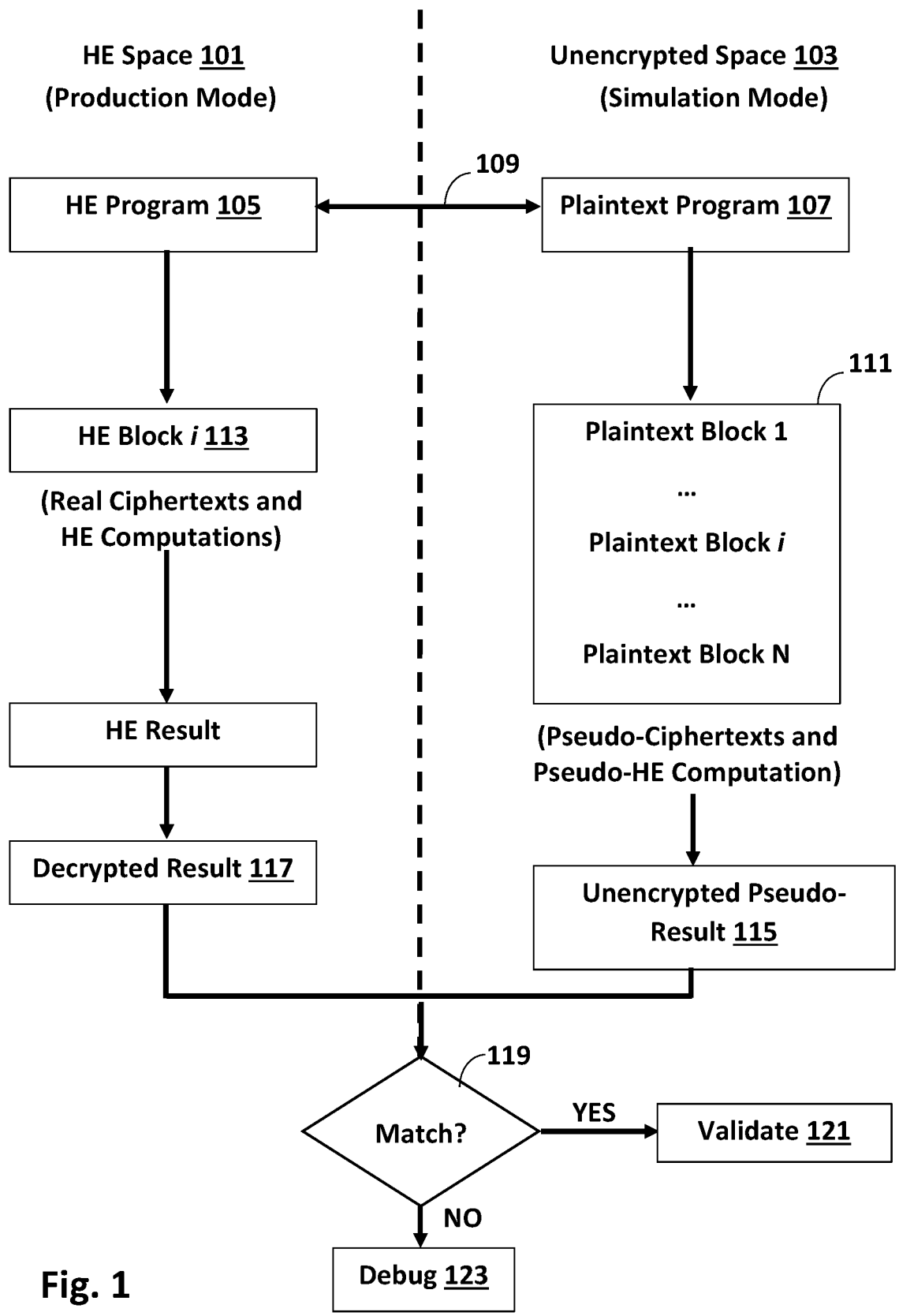
FIG. 1 is a schematic illustration of data structures for efficiently debugging a homomorphically encrypted program, according to some 'embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the invention debug a HE program in a hybrid encrypted-unencrypted environment in which the program's code is tested primarily in the unencrypted plaintext space (simulation mode using simulated or pseudo-ciphertexts and pseudo-HE operations that are plaintext) and a minority sampling of the program's code is tested in encrypted space (production mode using true ciphertexts and HE operations) to validate the accuracy of the simulation mode test. This hybrid environment is generated by mapping a program between an HE space and a plaintext space. The map is a non-linear translation of program data (e.g., between encrypted data in HE space, such as, ring elements, and plaintext data in plaintext space, such as, vectors of integers) and a non-linear translation of program operations (e.g., between encrypted operations in HE space, such as, ring algebra in FHE including addition and multiplication in a ring, and plaintext operations in plaintext space, such as, RAM compute or classic compute models, including addition and multiplication in plaintext space). For example, pseudo-ciphertexts and pseudo-HE operations may be plaintext representations of the data contained in the ciphertext and HE operations without encryption (e.g., plaintext vectors of the integers that are encrypted in the HE ciphertext). Once a map is established between the plaintext space ("pseudo" or "simulated" ciphertexts in simulation mode) and encrypted space (true ciphertexts in production mode), hybrid encrypted-unencrypted program debugging may be executed by toggling back and forth between plaintext and encrypted spaces.

Debugging simulated ciphertexts in the relatively efficient plaintext space, instead of the true ciphertexts in the relatively inefficient HE space, for at least some of the program code, may increase testing and debugging speed and reduce memory usage and processor cycles. The speed up for testing code in the unencrypted space (in simulation mode) is at least an order of magnitude (ten times) faster, sometimes more depending on the configuration, compared to convention HE debugging. The total increase in debugging speed and reduction in processing cycles and memory usage may thus be proportional to the reduction in the program code executed in HE space, as compared to conventional debugging that tests the entire program code for bugs in the HE space. For example, compared to conventional 100% execution in HE space, an X % reduction in program code computations executed in HE space may yield a (10×X %) speed up in program testing and a (10×X %) times reduction in processing cycles and memory usage. This speed-up may be tuned to balance the accuracy requirements (increasing with a higher X) and speed (increasing with a lower X). In one example, conventionally debugging a Field-programmable gate array (FPGA) programmable circuit often takes days, whereas debugging the circuit according to embodiments of the invention can take just minutes.

Embodiments of the invention may toggle or switch back and forth among any combination of three modes in a flexible and dynamic integrated development environment (IDE):

1. Production mode—an IDE mode depicting the HE program code.
2. Simulation mode—an IDE mode depicting the plaintext code simulating ciphertexts of the HE code.
3. Simultaneous Production mode and Simulation mode—an IDE mode simultaneously depicting both the HE program code and the plaintext code simulating equivalent ciphertexts.

Toggling between modes may be performed automatically (e.g., by a processor according to a debugging algorithm) or manually (switched by a user).

In the production mode of operation, the IDE depicts the code in the way it will work in production, making production easier to maintain and debug in its encrypted form.

In the simulation mode of operation, the IDE depicts the code in the way it will work during code runtime. For example, the simulation mode IDE may expose pseudo-HE primitive and/or evaluation computations, which may be termed as EvalAdd, EvaluMult, etc. This allows the IDE to "simulate" the crypto primitives by meeting the input and output signatures, while using plaintext instead of ciphertext (a sort of "dummy" or "simulated" ciphertext). This simulation mode IDE allows users to check the algorithm and flow of the code during simulation.

In the simultaneous production-simulation mode of operation, the IDE simultaneously depicts the code in the way it will work during both code production and runtime, which may address cryptographic layer behavior. For instance, integer computation (e.g., BGV and BFV schemes) may be ring modular arithmetic (and therefore overflow may be difficult to detect) or when floating numbers are used (e.g., CKKS scheme) arithmetic may be approximated. In addition, there are additional "maintenance" cryptographic functions such as rescaling (e.g., in CKKS) or modulus switching (e.g., in BGV). The corresponding behavior cannot be captured in conventional systems, whereas the production and simulation IDE mode exposes this behavior, e.g., where each ciphertext is replaced by an object that includes both. For example, CKKS relies on probabilistic sampling, and the probabilistic behavior takes longer to compute analytically than it does to perform in real-world computations, so using simulation is currently the best known way to debug, by an order of magnitude.

A new integrated development environment (IDE) may allow a programmer to seamlessly switch between all or any combination of these three modes of operation. To this end, embodiments of the invention provide not only a more flexible way of representing the ciphertext, but also deal with other challenges imposed by secure computation, such as, the presence of different actors that desire both to collaborate and to protect their own data or model. For example, every actor may bring their own probabilistic perturbations to the computations increasing the difficulty of estimation and making executing the HE code significantly more difficult, which make simulation approaches according to embodiments of the invention more attractive than conventional approaches.

According to some embodiments of the invention, it may be desirable for these modes of operation to be part of the IDE, rather than the code itself, in order to prevent the possibility of security compromises (e.g., if the 2nd or 3rd mode of operations are left allowed by mistake) and deliver the production HE code only.

Debugging may be executed, according to some embodiments of the invention, by executing the full plaintext program in simulation mode and only a partial sampling of the HE program in production mode to validate a subset of the simulation mode debugging. In other embodiments, any combination of the full or partial plaintext and HE programs may be debugged.

Some embodiments may perform a first test pass of a program's code (e.g., an entire program or sub-program) in plaintext simulation mode (e.g., simulate dummy encrypted computations in plaintext space) and a second test pass of a sample of a sub-portion of the equivalent encrypted program code in production mode (e.g., execute the true encrypted computations on encrypted data in HE space and decrypt the result). If results match for equivalent program code portions of the simulation and production mode, the code is validated. Otherwise, the program has an error and is debugged. The program bug or error may be in the program itself of an error in the mapping between the HE program and the plaintext program. The program can be debugged in decrypted (true plaintext) space, simulation (dummy plaintext) space, and/or HE space. Debugging in the simulation (dummy plaintext) space is faster than the HE space by at least an order of magnitude. Debugging in the simulation (dummy plaintext) space (e.g., by running the computations and obtaining input-output behaviors) is also faster than debugging in the decrypted (true plaintext) space because the simulated can better emulate the behavior of the program in production, and is thus more accurate when performed in simulation. For example, the decrypted space typically "embeds" data in noise, and the computations without noise do not reflect how some of the data can be destroyed during unencrypted computations. Simulation is needed in these scenarios to properly and accurately model the data. After all bug tests are validated, a final program test may be run over the entire program in HE space, which while time-consuming will typically only occur once as a final check (assuming the efficient hybrid debugging has corrected all bugs). The first and second passes may be performed in sequence or in parallel (e.g., computations on equivalent programs or sub-programs of plaintext and HE code executed in at least partially overlapping times). The validated subsample performed in the HE space in the second pass may be selected from the code, e.g., at random, using exhaustive testing (e.g., at some point all samples are tested), and/or using unit testing (e.g., exercising every branch of code).

In each pass, some embodiments may execute multiple sub-passes for debugging with increased fidelity (reduced allowable error). Initially, each pass may encode each value with an initial fixed number of floating points corresponding to an initial relatively low fixed precision. Then each subsequent sub-pass may progress to increase the fidelity of the computations by encoding each value with a relatively increased number of floating points corresponding to a relatively increased fixed precision or reduced allowable error. Increasing the fidelity in each sub-pass iteration may decrease the allowable error or maximum divergence between the first pass simulation mode results and the second pass production mode results.

Reference is made to FIG. 1, which schematically illustrates data structures for efficiently debugging a homomorphically encrypted program, according to some 'embodiments of the invention. Data structures shown in FIG. 1 may be executed by processor(s) and/or stored in memory devices e.g., depicted in FIG. 3 (e.g., one or more processors 116 and/or one or more memory unit(s) 118 or database(s) 114, respectively).

FIG. 1 depicts two distinct computational environments—a homomorphically encrypted (HE) space 101 and an unencrypted (plaintext) space 103. Production mode executes and/or displays HE space 101 on an IDE, simulation mode executes and/or displays unencrypted space 103 on the IDE, and simultaneous production-simulation mode executes and/or displays both spaces 101 and 103 simultaneously on the IDE.

The HE debugger program may switch automatically, and/or a user many switch manually, to toggle an integrated development environment (IDE) among three modes of operation: a production mode that executes and/or displays real ciphertext data and encrypted operations of a HE program 105 in HE space 101, a simulation mode that executes and/or displays plaintext pseudo-ciphertext data and pseudo-encrypted operations of a plaintext program 107 in unencrypted (plaintext) space 103, and a hybrid simulation-production mode that simultaneously that executes and/or displays both the real ciphertext data and encrypted operations of the HE program 105 and the equivalent plaintext pseudo-ciphertext data and pseudo-encrypted operations of the plaintext program 107.

HE program 105 comprising ciphertexts and encrypted computations in HE space 101 may be mapped or translated by a map 109 to an equivalent (or similar) unencrypted (plaintext) program 107 comprising plaintext and classical computations in unencrypted space 103 that mimic at least some of the HE ciphertexts (pseudo-ciphertexts) and HE program's encrypted computations (pseudo-encrypted computations). Map 109 may allow a debugger to switch or toggle back and forth among production mode depicting HE program 105 in HE space 101, simulation mode depicting unencrypted program 107 in unencrypted space 103, or simultaneous production-simulation mode simultaneously depicting both HE program 105 in HE space 101 and unencrypted program 107 in unencrypted space 103.

The HE debugger program may determine if HE program 105 and/or map 109 have errors. The HE debugger program may independently execute the unencrypted (e.g., full or partial) program 107 in unencrypted space 103 in a first pass and execute the HE program 105 in HE space 101 in a second pass. The first unencrypted space 103 pass may execute a greater portion of (e.g., the full) program code than the second HE space 101 pass. For example, the first unencrypted space 103 pass may execute plaintext pseudo-encrypted operations 111 corresponding to N blocks of code of the HE program, whereas the second HE space 101 pass may execute a subset or sampling of M<<N blocks of code of the HE program 113 (i.e., where M is significantly less than N, such as 5%, 10%, 20% . . . less than 50% of N). For example, the sampling of M blocks of HE code 113 may be composed of HE atomic elements (e.g., EvalADD, EvalMult, etc.), procedures, and/or functions, equivalent to the plaintext pseudo-encrypted operations 111. In various embodiments, the M blocks of HE code 113 may be selected by sampling the program 105 and/or equivalent program 107 at random, using exhaustive testing, or using unit testing to exercise every (or an above threshold) branch of code (e.g., detecting bugs by observing input/output maps, such as, (1,2)→3). Executing the N blocks of plaintext pseudo-encrypted operations 111 in the first unencrypted pass generates a simulation mode result 115 and executing the subset of M blocks of HE code operations 113 in the second HE pass generates a production mode result 117.

Once both passes are executed, the program compares their respective HE and plaintext results 115 and 117 to determine if they match 119 (e.g., to within a fixed floating point precision or threshold error).

If the compared results 115 and 117 match, HE program 105 (e.g., the full program or at least the N blocks of code executed in simulation mode) is validated 121 and/or no bugs are detected. If, however, the compared results 115 and 117 do not match, HE program 105 and/or map 109 (e.g., the full program or at least the N blocks of code executed in simulation mode) is invalidated, bugs are detected, and the program code 105 and/or 107 and/or the map 109 is debugged 123. Bugs may be corrected by comparing the erroneous code to a baseline of test cases with known input and output maps and adjusting/correcting the code to match those maps. For example, the debugging program may detect a test case where the input/output map is not correct, then trace to where in the computation code the incorrect results originated e.g. due to noise embedding issues by tracing through each step of the computation to see where the error occurred.

In some embodiments, both passes may be repeated for multiple sub-passes with incrementally increased accuracy by increasing the number of fixed floating points used to represent the data and thus decreasing the maximum error allowed to achieve a match. Because increasing the floating point representation of data increases their associated computations, incrementally increasing the floating point representation only after a lower floating point representation is verified may achieve a faster and more efficient comparison program than using maximum precision for all passes. The number of sub-passes may be fixed or dynamic, and/or may proceed until an error is found to output a measurement of accuracy.

Figure 2:
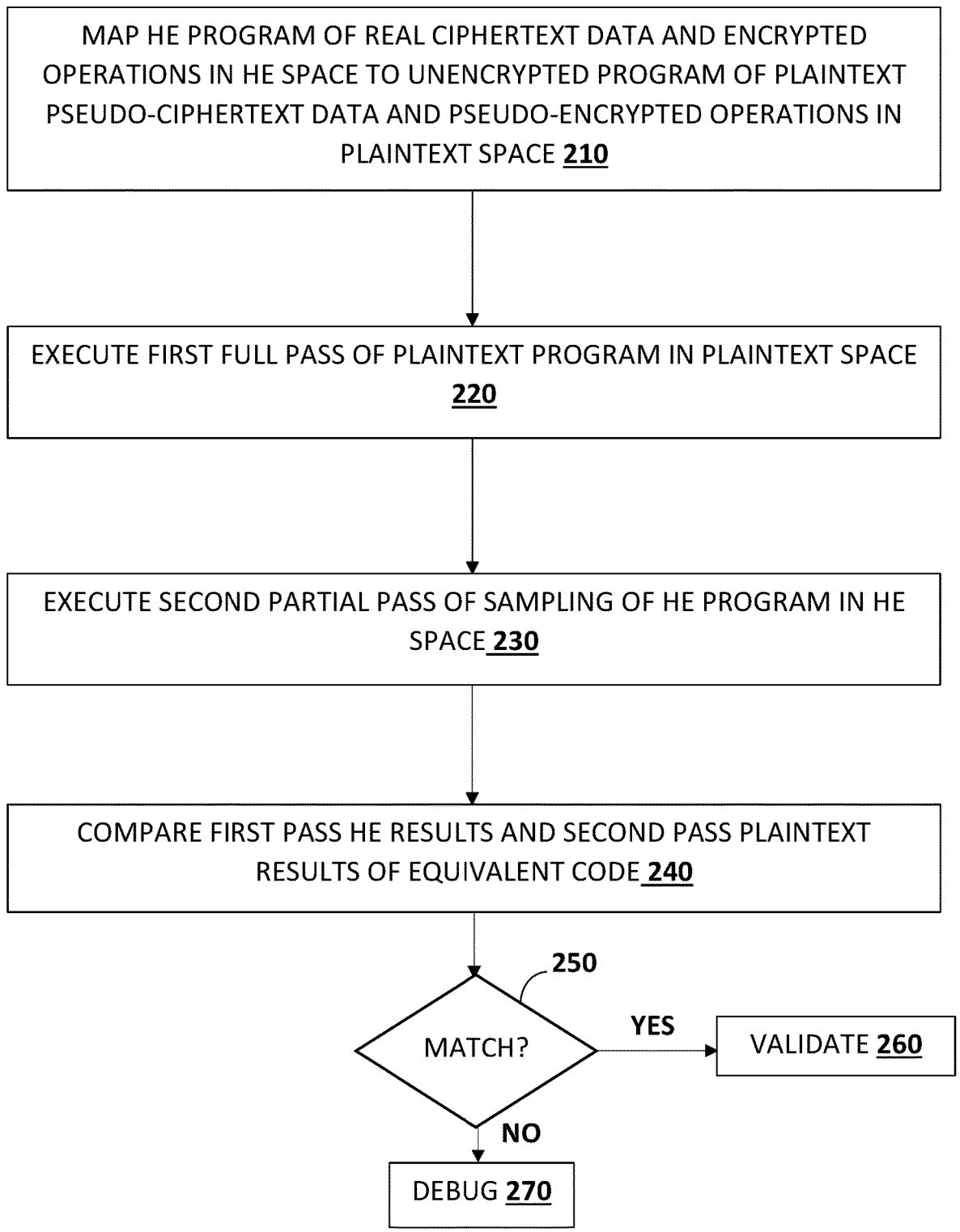
FIG. 2 is a flowchart of a method for efficiently debugging a homomorphically encrypted program, according to some embodiments of the invention.

Reference is made to FIG. 2, which is a flowchart of a method for efficiently debugging a homomorphically encrypted program, according to some embodiments of the invention. Operations of FIG. 2 may generate or use the data structures disclosed in reference to FIG. 1 and may be executed by processor(s) and/or stored in memory devices e.g., depicted in FIG. 3 (e.g., one or more processors 116 and/or one or more memory unit(s) 118 or database(s) 114, respectively). Other devices or systems may also be used.

In operation 210, a processor may generate and operate a map (e.g., 109 of FIG. 1) between a homomorphically encrypted program (e.g., 105 of FIG. 1) comprising real ciphertext data and encrypted operations in the homomorphically encrypted space (e.g., 101 of FIG. 1) and an equivalent plaintext program (e.g., 107 of FIG. 1) comprising plaintext pseudo-ciphertext data and pseudo-encrypted operations in plaintext space (e.g., 103 of FIG. 1) that simulate at least some of the real homomorphically encrypted ciphertext data and operations. The map may comprise a translation between the real ciphertext data that are ring elements and plaintext pseudo-ciphertext data that are vectors of integers. Additionally or alternatively, the map may comprise a translation between encrypted operations that are ring computations to plaintext pseudo-encrypted operations that are classic compute operations.

In operation 220, a processor may execute a first pass of the full or partial code of the plaintext program comprising the plaintext pseudo-ciphertext data and pseudo-encrypted operations in plaintext space.

In operation 230, a processor may execute a second partial pass of a sampling of the homomorphically encrypted program comprising the real ciphertext data and operations in homomorphically encrypted space that are equivalent to a subset of the plaintext pseudo-ciphertext data and pseudo-encrypted operations executed in the first pass. The sampling of the homomorphically encrypted program may be selected e.g., at random, using exhaustive testing, or using unit testing.

Operation 220 executed in unencrypted space and operation 230 executed in HE space may be performed in parallel or in sequence. The code, execution and results of the unencrypted and HE programs may be viewed in an integrated development environment (IDE) by switching between a production mode operating the homomorphically encrypted program, a simulation mode displaying the plaintext program, and a hybrid simulation-production mode simultaneously displaying equivalent both the plaintext program and the homomorphically encrypted program.

In operation 240, a processor may compare the results of the subset of the real ciphertext data and operations in the first pass of the HE program and the equivalent plaintext pseudo-ciphertext data and pseudo-encrypted operations in the second pass of the plaintext program.

In operation 250, a processor may determine if the compared results of operations 230 and 240 match. If the results of operations 230 and 240 match, a processor may proceed to operation 260; whereas if the results of operations 230 and 240 do not match, a processor may proceed to operation 270.

In operation 260, when the results of operations 230 and 240 match, a processor may validate the homomorphically encrypted program and/or map. After validating one or more sampling(s) of the homomorphically encrypted program, a processor may execute the complete homomorphically encrypted program in homomorphically encrypted space to test for program bugs.

In operation 270, when the results of operations 230 and 240 do not match, a processor may invalidate and/or debug the homomorphically encrypted program and/or map. Debugging the mapping between the homomorphically encrypted program and the plaintext program may involve comparing the code mapping to a plurality of test cases with known input and output maps, detecting a test case where the input and output map does not match the code mapping, and tracing the mismatched results to a portion of the homomorphically encrypted program or plaintext program as a source of a bug.

Operations 220-260 may be repeated for a plurality of iterations (sub-passes) of increased fidelity, wherein in each sequential iteration accuracy requirement for the results to match in operation 250 increases.

Other operations, or orders of operations, may be used.

Figure 3:
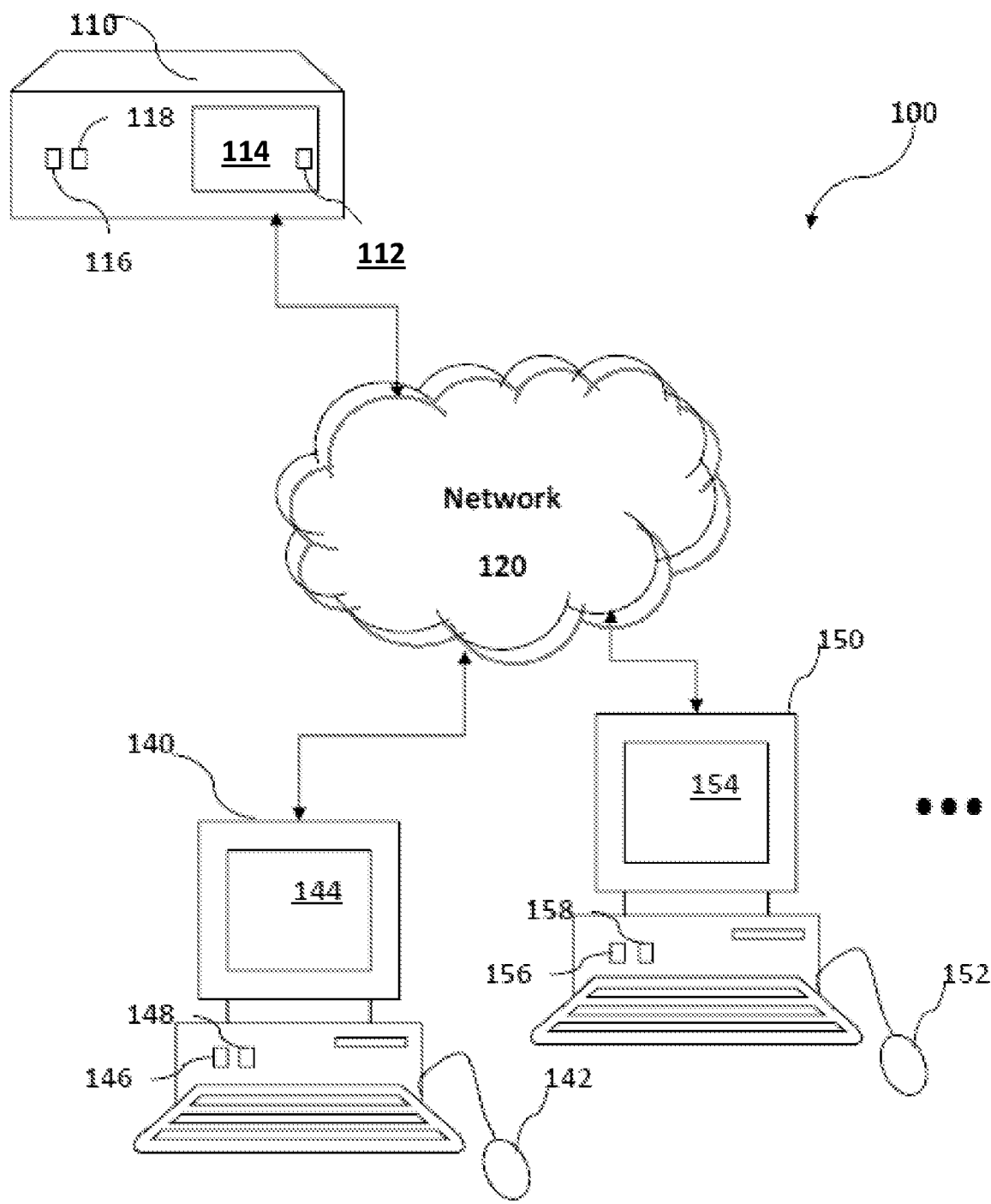
FIG. 3 is a schematic illustration of a system for efficiently debugging a homomorphically encrypted program, according to some embodiments of the invention.

Reference is made to FIG. 3, which schematically illustrates a system 100 for efficiently debugging a homomorphically encrypted program, according to some 'embodiments of the invention. The above described embodiments may be executed using any single or combination of devices and/or components of system 100 of FIG. 3. The devices of system 100 may be operated by one or more parties including secure and insecure parties. Secure parties may operate on unencrypted data (e.g., the IDE provider homomorphically encrypting the data, code and/or environment), while insecure parties typically operate on the homomorphically encrypted (but not unencrypted) data over the IDE.

System 100 may include one or more server(s) 110, database(s) 114, and/or computer(s) 140, 150, . . . , any of which may operate as a secure or insecure party. Any or all of system 100 devices may be connected via one or more network(s) 120. Secure parties may each securely store unencrypted (or encrypted) data and private keys associated with each dataset, party, etc. Insecure parties may not access the unencrypted data or private keys.

Database 114 may include software processes or applications for storing and retrieving data 112 such as the aforementioned data structures, computations, and/or encryption and/or decryption keys. Data 112 may also include code (e.g., software code) or logic, e.g., to enable the application of the IDE according to embodiments of the invention. Database 114 may be internal or external to one or more of server(s) 110 and/or computer(s) 140 and/or 150 (not shown) and may be connected thereto by a local or remote and a wired or wireless connection. In alternate embodiments, data 112 may be stored in an alternate location separate from database 114, e.g., memory unit(s) 118, 148, and/or 158.

Computers 140 and 150 may be servers, personal computers, desktop computers, mobile computers, laptop computers, and notebook computers or any other suitable device such as a cellular telephone, personal digital assistant (PDA), video game console, etc., and may include wired or wireless connections or modems. Computers 140 and 150 may include one or more input devices 142 and 152, respectively, for receiving input from a user (e.g., via a pointing device, click-wheel or mouse, keys, touch screen, recorder/microphone, other input components). Computers 140 and 150 may include one or more output devices 144 and 154 (e.g., a monitor or screen) for displaying data to a user provided by or for server(s) 110. Network 120, which connects server(s) 110 and computers 140 and 150, may be any public or private network such as the Internet. Access to network 120 may be through wire line, terrestrial wireless, satellite or other systems well known in the art.

Server(s) 110 and computers 140 and 150, may include one or more controller(s) or processor(s) 116, 146, and 156, respectively, for executing operations according to embodiments of the invention and one or more memory unit(s) 118, 148, and 158, respectively, for storing data (e.g., encryption and/or decryption keys, and encrypted and/or decrypted data) and/or instructions (e.g., software for applying computations or calculations, keys to encrypt or decrypt data according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

The HE program being debugged may be any program, such as, a machine learning program, e.g., executing or training a neural network. The program may be executed for any application such as security applications, autonomous vehicle driving, drone navigation, facial recognition, text recognition, or other deep learning applications.

Substantially, approximately, or similar may refer herein to a deviation from an exact measure of any threshold less than or equal to 10%. Significantly may refer herein to as greater than 50%.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., memory units 118, 148, and/or 158 of FIG. 3), a disk drive, or a USB flash memory, encoding, including or storing instructions, e.g., computer-executable instructions, which, when executed by a processor or controller (e.g., processor 116, 146, and/or 156 of FIG. 3), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method for debugging a homomorphically encrypted program, the method comprising:
   mapping between the homomorphically encrypted program comprising real ciphertext data and encrypted operations in the homomorphically encrypted space and an equivalent plaintext program comprising plaintext pseudo-ciphertext data and pseudo-encrypted operations in plaintext space that simulate at least some of the real homomorphically encrypted ciphertext data and operations;
   in a first full pass, executing the plaintext program comprising the plaintext pseudo-ciphertext data and pseudo-encrypted operations in plaintext space;
   in a second partial pass, executing a sampling of the homomorphically encrypted program comprising a subset of the real ciphertext data and operations in homomorphically encrypted space that are equivalent to the plaintext pseudo-ciphertext data and pseudo-encrypted operations;
   comparing the results of the subset of the real ciphertext data and operations in the first pass of the HE program and the equivalent plaintext pseudo-ciphertext data and pseudo-encrypted operations in the second pass of the plaintext program;
   if the compared results match, validating the homomorphically encrypted program and if the compared results do not match debugging the mapping between the homomorphically encrypted program and the plaintext program; and
   repeating each pass for a plurality of iterations of increased fidelity by encoding each value with a relatively increased number of floating points corresponding to a relatively increased fixed precision or reduced allowable error, wherein in each sequential iteration accuracy requirement for the results to match increases.

2. The method of claim 1 comprising, after validating the homomorphically encrypted program, executing the complete homomorphically encrypted program in homomorphically encrypted space to test for program bugs.

3. The method of claim 1 comprising providing an integrated development environment (IDE) that switches between a production mode displaying the homomorphically encrypted program, a simulation mode displaying the plaintext program, and a hybrid simulation-production mode simultaneously displaying equivalent both the plaintext program and the homomorphically encrypted program.

4. The method of claim 1 comprising selecting the sampling of the homomorphically encrypted program at random, using exhaustive testing, or using unit testing.

5. The method of claim 1, wherein the mapping is a translation between the real ciphertext data that are ring elements and plaintext pseudo-ciphertext data that are vectors of integers.

6. The method of claim 1, wherein the mapping is a translation between encrypted operations that are ring computations to plaintext pseudo-encrypted operations that are classic compute operations.

7. The method of claim 1, wherein the first and second passes are executed sequentially or in parallel.

8. The method of claim 1, wherein debugging the mapping between the homomorphically encrypted program and the plaintext program comprises:
   comparing the code mapping to a plurality of test cases with known input and output maps;
   detecting a test case where the input and output map does not match the code mapping; and
   tracing the mismatched results to a portion of the homomorphically encrypted program or plaintext program as a source of a bug.

9. A system for debugging a homomorphically encrypted program, the system comprising:

one or more memories configured to store the homomorphically encrypted program comprising real ciphertext data and encrypted operations in the homomorphically encrypted space; and one or more processors configured to:
- generate or receive a map between the homomorphically encrypted program comprising real ciphertext data and encrypted operations in the homomorphically encrypted space and an equivalent plaintext program comprising plaintext pseudo-ciphertext data and pseudo-encrypted operations in plaintext space that simulate at least some of the real homomorphically encrypted ciphertext data and operations;
- in a first full pass, execute the plaintext program comprising the plaintext pseudo-ciphertext data and pseudo-encrypted operations in plaintext space;
- in a second partial pass, execute a sampling of the homomorphically encrypted program comprising a subset of the real ciphertext data and operations in homomorphically encrypted space that are equivalent to the plaintext pseudo-ciphertext data and pseudo-encrypted operations;
- compare the results of the subset of the real ciphertext data and operations in the first pass of the HE program and the equivalent plaintext pseudo-ciphertext data and pseudo-encrypted operations in the second pass of the plaintext program;
- if the compared results match, validate the homomorphically encrypted program and if the compared results do not match debug the mapping between the homomorphically encrypted program and the plaintext program; and
- repeat each pass for a plurality of iterations of increased fidelity by encoding each value with a relatively increased number of floating points corresponding to a relatively increased fixed precision or reduced allowable error, wherein in each sequential iteration accuracy requirement for the results to match increases.

10. The system of claim 9, wherein the one or more processors are configured to, after validating the homomorphically encrypted program, execute the complete homomorphically encrypted program in homomorphically encrypted space to test for program bugs.

11. The system of claim 9, wherein the one or more processors are configured to provide an integrated development environment (IDE) that switches between a production mode displaying the homomorphically encrypted program, a simulation mode displaying the plaintext program, and a hybrid simulation-production mode simultaneously displaying equivalent both the plaintext program and the homomorphically encrypted program.

12. The system of claim 9, wherein the one or more processors are configured to select the sampling of the homomorphically encrypted program at random, using exhaustive testing, or using unit testing.

13. The system of claim 9, wherein the mapping is a translation between the real ciphertext data that are ring elements and plaintext pseudo-ciphertext data that are vectors of integers.

14. The system of claim 9, wherein the mapping is a translation between encrypted operations that are ring computations to plaintext pseudo-encrypted operations that are classic compute operations.

15. The system of claim 9, wherein the one or more processors are configured to execute the first and second passes sequentially or in parallel.

16. The system of claim 9, wherein the one or more processors are configured to debug the mapping between the homomorphically encrypted program and the plaintext program by executing a processor to:
- compare the code mapping to a plurality of test cases with known input and output maps;
- detect a test case where the input and output map does not match the code mapping; and
- trace the mismatched results to a portion of the homomorphically encrypted program or plaintext program as a source of a bug.

* * * * *